United States Patent
Goss (10) Patent No.: US 9,428,236 B2
(45) Date of Patent: Aug. 30, 2016

(54) LEAN-COMPENSATING MOTORCYCLE WITH CHANNEL WHEELS

(71) Applicant: Bryan Goss, West Hills, CA (US)

(72) Inventor: Bryan Goss, West Hills, CA (US)

( * ) Notice: Subject to any disclaimer, the term of this patent is extended or adjusted under 35 U.S.C. 154(b) by 0 days.

(21) Appl. No.: 14/535,219

(22) Filed: Nov. 6, 2014

(65) Prior Publication Data

US 2015/0123389 A1    May 7, 2015

Related U.S. Application Data

(60) Provisional application No. 61/900,941, filed on Nov. 6, 2013.

(51) Int. Cl.
*B62K 11/00* (2006.01)
*B60G 99/00* (2010.01)

(52) U.S. Cl.
CPC ............ *B62K 11/00* (2013.01); *B60G 99/002* (2013.01); *B60G 2300/12* (2013.01); *B60G 2300/45* (2013.01)

(58) Field of Classification Search
CPC ........ B62K 11/00; B62K 5/10; B62D 24/04; B60R 21/13; B60G 2300/45; B60G 2300/13; B60G 2300/12
USPC ............ 280/755, 124.103, 6.15, 6.16, 6.154; 180/41, 219, 282
See application file for complete search history.

(56) References Cited

U.S. PATENT DOCUMENTS

| | | | |
|---|---|---|---|
| 3,124,007 A | 3/1964 | Swinney | |
| 3,373,832 A | 3/1968 | Summers | |
| 3,698,502 A * | 10/1972 | Patin | B62D 37/04 180/215 |
| 4,065,144 A * | 12/1977 | Winchell | B60G 21/00 180/217 |
| 4,088,199 A * | 5/1978 | Trautwein | B60G 21/007 180/209 |
| 4,200,168 A | 4/1980 | Moog | |
| 4,293,052 A | 10/1981 | Daswick et al. | |
| 4,368,795 A * | 1/1983 | Tidwell | B62D 47/02 180/212 |
| 4,423,795 A * | 1/1984 | Winchell | B60G 21/007 180/215 |
| 4,691,798 A | 9/1987 | Engelbach | |
| 4,700,762 A | 10/1987 | Landers | |
| 4,726,407 A | 2/1988 | Hayakawa et al. | |
| 4,796,683 A | 1/1989 | Kawabata et al. | |
| D302,671 S * | 8/1989 | Miller | D12/544 |

(Continued)

FOREIGN PATENT DOCUMENTS

| | | | | |
|---|---|---|---|---|
| AU | WO 2005075278 A1 * | 8/2005 | | B62D 9/02 |
| AU | WO 2011029795 A1 * | 3/2011 | | B62K 5/027 |

(Continued)

*Primary Examiner* — Ruth Ilan
(74) *Attorney, Agent, or Firm* — Robert Lauson; Lauson & Tarver LLP (57) ABSTRACT

A lean-compensating motorcycle for balancing a user includes a lower frame with wide wheels and an upper frame supporting a rider. The lower and upper frames pivot on an axis substantially parallel to the motorcycle's line of travel, and a pivot drive governs pivoting movement. The pivot drive is controlled by a level-sensing control system that adjusts the pivot drive to maintain the upper frame upright by applying force against the lower frame, the lower frame counterbalancing the pivoting motion against the wide wheels. The wheels ideally include a central channel sized to accommodate raised pavement markers, such as dots and reflectors, to provide for smooth travel. The upper frame includes a housing in which the user sits, in a manner similar to a conventional automobile since propping the motorcycle up with the user's legs is largely unnecessary.

17 Claims, 11 Drawing Sheets

(56) References Cited

U.S. PATENT DOCUMENTS

| | | | |
|---|---|---|---|
| 4,887,688 A | 12/1989 | Horiike et al. | |
| 4,903,790 A | 2/1990 | Horiike et al. | |
| 4,917,209 A * | 4/1990 | Horiike | B62K 11/00 |
| | | | 180/219 |
| 5,014,807 A | 5/1991 | Horiike et al. | |
| 5,076,388 A | 12/1991 | Horiike et al. | |
| 5,107,950 A | 4/1992 | Horiike et al. | |
| 5,257,671 A | 11/1993 | Watkins | |
| 5,337,815 A | 8/1994 | Graas | |
| 5,358,022 A | 10/1994 | Glover et al. | |
| 5,373,882 A | 12/1994 | Nakagawa | |
| 5,401,055 A * | 3/1995 | Pham | B62D 61/02 |
| | | | 180/209 |
| 5,435,365 A | 7/1995 | Tanaka | |
| 5,645,658 A | 7/1997 | Gerard et al. | |
| 5,820,439 A | 10/1998 | Hair, III | |
| 5,857,535 A * | 1/1999 | Brooks | B60N 2/39 |
| | | | 180/282 |
| 6,056,078 A | 5/2000 | Pham | |
| 6,142,253 A | 11/2000 | Mueller et al. | |
| 6,170,847 B1 * | 1/2001 | Pham | B62D 31/003 |
| | | | 180/209 |
| 6,276,480 B1 * | 8/2001 | Aregger | B62D 31/003 |
| | | | 180/213 |
| 6,347,653 B1 | 2/2002 | Kobayashi | |
| 6,360,838 B1 | 3/2002 | Kulhavy | |
| 6,439,284 B1 | 8/2002 | Fontaine | |
| 6,499,520 B1 | 12/2002 | Yoshioka et al. | |
| 6,505,661 B1 | 1/2003 | Nakagawa et al. | |
| 6,668,887 B1 | 12/2003 | Gerresheim | |
| 6,685,208 B1 * | 2/2004 | Cowie | B62H 1/10 |
| | | | 280/293 |
| 7,100,727 B2 * | 9/2006 | Patin | B62K 5/027 |
| | | | 180/180 |
| 7,249,622 B2 | 7/2007 | Roedseth | |
| 7,287,774 B2 | 10/2007 | Mullins | |
| 7,487,985 B1 * | 2/2009 | Mighell | B62K 5/027 |
| | | | 180/210 |
| 7,552,790 B2 * | 6/2009 | Dower | B62D 9/02 |
| | | | 180/210 |
| 7,600,596 B2 * | 10/2009 | Van Den Brink | B62J 25/00 |
| | | | 180/210 |
| 7,743,871 B2 * | 6/2010 | Chien | B60G 17/0162 |
| | | | 180/282 |
| 7,748,746 B2 | 7/2010 | Beiber Hoeve et al. | |
| 7,822,575 B2 | 10/2010 | Suzuki et al. | |
| 7,975,618 B2 | 7/2011 | Bullis | |
| 8,091,598 B2 | 1/2012 | Matsunaga | |
| 2,725,413 A1 | 9/2012 | Ishiyama et al. | |
| 2003/0102176 A1 * | 6/2003 | Bautista | B60G 21/007 |
| | | | 180/210 |
| 2004/0100059 A1 * | 5/2004 | Van Den Brink | B60G 21/007 |
| | | | 280/124.103 |
| 2006/0054375 A1 | 3/2006 | Kakinuma | |
| 2007/0262549 A1 * | 11/2007 | Haerr | B60G 21/007 |
| | | | 280/124.103 |
| 2008/0017432 A1 | 1/2008 | Chelen | |
| 2008/0100018 A1 * | 5/2008 | Dieziger | B60G 3/20 |
| | | | 280/124.103 |
| 2008/0169149 A1 | 7/2008 | Holroyd et al. | |
| 2009/0194961 A1 * | 8/2009 | Dieziger | B60G 3/20 |
| | | | 280/124.103 |
| 2012/0031696 A1 | 2/2012 | Wagner | |
| 2012/0098225 A1 * | 4/2012 | Lucas | B60G 3/20 |
| | | | 280/124.103 |
| 2012/0181765 A1 | 7/2012 | Hill et al. | |
| 2012/0298437 A1 | 11/2012 | Dietz | |
| 2013/0131923 A1 * | 5/2013 | Tzipman | B62D 24/04 |
| | | | 701/38 |
| 2013/0168934 A1 * | 7/2013 | Krajekian | B62K 5/027 |
| | | | 280/62 |
| 2013/0193656 A1 * | 8/2013 | Itoh | B62K 5/05 |
| | | | 280/5.509 |
| 2015/0021865 A1 * | 1/2015 | Lin | B60G 21/005 |
| | | | 280/5.513 |
| 2015/0158360 A1 * | 6/2015 | Uebayashi | B60G 3/26 |
| | | | 280/5.508 |
| 2016/0023707 A1 * | 1/2016 | Neerman | B62J 1/005 |
| | | | 280/62 |

FOREIGN PATENT DOCUMENTS

| | | | | |
|---|---|---|---|---|
| BE | 1010650 A3 * | 11/1998 | | B60G 3/18 |
| CN | WO 2014190757 A1 * | 12/2014 | | B62K 5/027 |
| FR | 2383817 A1 * | 10/1978 | | B62D 21/183 |
| FR | CA 2572722 A1 * | 1/2006 | | B60G 21/007 |
| FR | 2933951 A1 * | 1/2010 | | B60G 17/005 |
| FR | CA 2730586 A1 * | 1/2010 | | B60G 17/005 |
| FR | 2946944 A1 * | 12/2010 | | B62D 9/02 |
| FR | WO 2015158976 A1 * | 10/2015 | | B60G 3/14 |
| GB | 2450740 A * | 1/2009 | | B60G 21/05 |
| JP | WO 2007007820 A1 * | 1/2007 | | B60G 21/04 |
| JP | EP 2810861 A1 * | 12/2014 | | B62K 5/10 |
| NL | WO 9534459 A1 * | 12/1995 | | B60G 9/02 |
| NO | WO 2005002957 A1 * | 1/2005 | | B60G 21/007 |
| WO | WO 2014/041210 A2 * | 3/2014 | | B60G 21/007 |

* cited by examiner

LEAN-COMPENSATING MOTORCYCLE WITH CHANNEL WHEELS

This application claims the benefit of the filing date of provisional application No. 61/900,941, filed on Nov. 6, 2013.

BACKGROUND

Motorcycles and other two wheeled vehicles known in the art employ gyroscopic forces to remain upright when travelling. Consequently these vehicles require support when at a stop, such as an operator holding up the vehicle by placing one foot on the ground. In some circumstances, it may be desirable to have the vehicle remain upright when standing still without having a foot on the ground, such as in rain, or heavy traffic conditions. Another problem encountered with two wheeled vehicles is the tendency for traffic markers, such as reflectors and ceramic domes protruding from the pavement to interrupt smooth travel of the vehicle, particularly when splitting lanes.

Apparatus for adjusting or compensating for gravitational forces against a two-wheeled vehicle, such as a motorcycle, are known in the art. Horiike (U.S. Pat. No. 5,076,388) discloses a vehicle having a sub-frame connected to a main frame of a vehicle. The sub-frame is able to bank around the main frame during cornering using a counterbalancing of centripetal forces and centrifugal forces as a driver makes a turn.

Moog (U.S. Pat. No. 4,200,168) discloses an apparatus for roll-stabilizing a vehicle. A compound physical pendulum is designed to sense any lateral acceleration of a vehicle, and using a rigid dumbbell-shaped member mounted on the upper end of a flexure tube, compensate for inertia. By using gyroscopic action, the dumbbell-shaped member is able to engage the vehicle and counter any overturning movement.

Apparatus for addressing tire performance are also known in the art. Yoshioka (U.S. Pat. No. 6,499,520) discloses a pneumatic tire having a circumferentially and continuously extending wide groove to enhance steering capability. Nakagawa et al. (U.S. Pat. No. 6,505,661) discloses a tire having a tread portion including a groove having longitudinal and lateral ribs to prevent bareness. Matsunaga (U.S. Pat. No. 8,091,598) discloses a tire with multiple grooves extending circumferentially around the motorcycle tire for stability.

The stabilizing apparatus currently disclosed in the art are designed to compensate for gravitational forces while a two-wheeled vehicle is in motion rather than at a standstill. The wheels having grooves disclosed in the prior art are adapted for performance enhancing characteristics or preventing excessive wear on a tire, and none of them present a groove large enough to straddle reflectors or lane dots.

There is therefore a need for a two-wheeled vehicle stabilization device, such as for a motorcycle, that corrects for gravitational forces when the vehicle is at rest. There is also a need for a two-wheeled vehicle tire that avoids protrusions in the pavement from traffic markers and lane dots that would otherwise interrupt smooth travel of the vehicle.

SUMMARY

A lean-compensating motorcycle for balancing a user includes a lower frame connected to the wheels of the motorcycle, and an upper frame having a user support, such as a motorcycle seat. A pivot structure is coupled to the lower frame and the upper frame, and allows the lower frame and the upper frame to move relative to each other. The moving, or twisting, motion occurs on an axis substantially parallel to the motorcycle's line of travel. A pivot drive coupled to both the lower frame and the upper frame is typically powered and adjustable, and governs the pivoting movement of the lower frame and the upper frame about the pivot. The pivot drive is governed by a control system that senses, collects and manages position data regarding the upper frame, controlling the behavior of the pivot to adjust the upper frame's position relative to the lower frame. Specifically, the control system adjusts the pivot drive's position to cause the pivot drive to maintain the upper frame in a substantially vertical position by applying force against the lower frame.

The motorcycle includes wheels that are preferably as wide or wider than the lower frame to allow counterbalancing when the upper frame pivots. The wheels ideally include a central channel, which is sized to accommodate raised pavement markers, such as dots and reflectors, to provide for smooth travel when in motion, and to allow the wheels to rest flat on the pavement when not in motion. In one embodiment, the wheels might be made of two separate tires having a common hub that forms the central channel.

Preferably, the upper frame includes a housing for protecting the user. The housing may be a protective cage, or may be a more solid housing that optionally incorporates a protective cage. Due to the counterbalancing characteristics of the motorcycle, the support in the upper frame may be a recumbent, automobile-type seat in lieu of a traditional motorcycle seat. Also, the upper frame may include a steering wheel, a brake pedal and a gas pedal like a conventional automobile.

For effective pivoting, the pivot may include a pivot platform that supports the upper frame, the lower frame surrounded by the pivot in a manner similar to a race bearing. To maximize the length of travel when leaning side to side, two pivot drives may be incorporated between the upper frame and lower frame and arranged in a cross configuration.

The control system governs the position of the pivot drives, and may also include an off-level alarm. With an alarm incorporated into the control system, it is possible to allow both automatic, and manually controlled pivoting. A movable pivot arm may be coupled to the lower frame and the upper frame to help support the upper frame as the pivot drive causes it to move relative to the lower frame. The pivot arm is preferably governed by the pivot drive.

In other embodiments, a curved rail in static relation to the lower frame, and about which the upper frame travels in an arc may characterize the pivot mechanism. In such an arrangement, grooved wheels may be positioned on the curved rail and coupled to the upper frame. A drive motor may control movement of the grooved wheels along with, or in lieu of the pivot drives.

The lean compensating motorcycle may also be characterized as having a pivoting frame with a lower section and an upper section in a pivoting relationship. The lower section is coupled to a wheel or wheels of the motorcycle, while the upper section includes a housing to protect the user. The lower section and the upper section are connected by a pivot driver, and the wheels are substantially wider than the lower section, so that when the upper section pivots relative to the lower section, the lower section counterbalances itself against the wheels. A level-sensing control system causing the pivot driver to maintain the upper frame upright whenever the upper frame lists away from vertical, and the wheels include a channel wide enough to accommodate raised highway markers for smooth travel.

To maintain an upright position when riding a two-wheeled motorcycle, a user rides the motorcycle, balancing it against gyroscopic force generated by the rotating wheels to keep the motorcycle upright. Eventually, the user must bring the motorcycle to a stop, thereby eliminating the gyroscopic force. Shortly after coming to a stop, the motorcycle begins leaning away from upright. At this point the lean-compensating mechanism begins twisting an upper section of the motorcycle relative to a lower section of the motorcycle to maintain the upper section upright.

The lower section counterbalances against the wheels to push back against the upper section. While stopped, a control system continuously monitors the upper section for any leaning movement away from substantially upright, and counters it against the lower section. When the motorcycle starts moving again, gyroscopic force is once again generated by the rotating wheels, allowing conventional balancing. It is anticipated that the lean-compensating function can function in lieu of, or in concert with conventional balancing.

REFERENCE NUMBERS 10. motorcycle
12. lower frame
14. upper frame
16. channel wheels
18. control system
20. pivot drive cylinder
22. pivot
23. platform
24. housing
26. channel
28. seat
30. steering wheel
32. dashboard
34. gas pedal
36. brake pedal
100. first alternative embodiment motorcycle
102. lower frame
104. upper frame
106. channel wheels
108. channel
110. center line
112. pivot
114. pivot drive cylinder
116. control system
118. housing
120. seat
122. steering wheel
124. dashboard
126. gas pedal
128. brake pedal
200. second alternative embodiment motorcycle
202. lower frame
204. upper frame
206. channel wheels
208. pivot
210. pivot drive cylinder
212. control system
300. third alternative embodiment motorcycle
302. pivot drive cylinder
304. upper frame
306. lower frame
308. pivot
310. control system
312. channel wheels
400. fourth alternative embodiment motorcycle
402. curved rail
404. upper frame
406. lower frame
408. grooved wheels
410. channel wheels
412. control system
414. drive motor

DESCRIPTION

Figure 1:
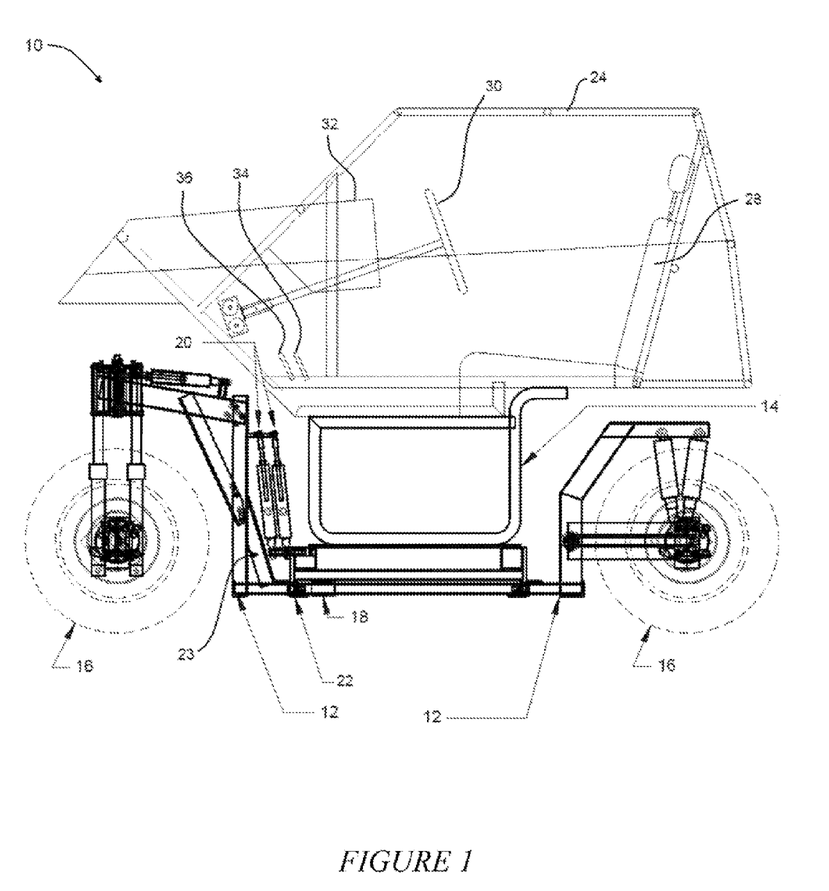
FIG. 1 is a side view of a lean-compensating motorcycle having a housing and channel wheels ("motorcycle").

Referring to FIG. 1, a side view of a lean-compensating motorcycle, in its primary embodiment with channel wheels ("motorcycle") 10 is shown. The motorcycle 10 includes a lower frame 12, an upper frame 14 for a rider, and channel wheels 16. The lower frame 12 is adapted to allow the upper frame 14 to lean relative to the channel wheels 16, allowing the lower frame 12 to counterbalance the upper frame 14 against the channel wheels 16 if the upper frame 14 begins to lean in a direction other than vertical. The channel wheels 16 may be widened to form an outrigger-type structure for effective counterbalancing support.

Still referring to FIG. 1, when the motorcycle 10 comes to a stop and the upper frame 14 begins to list, a control system 18 senses, collects and manages position data regarding the upper frame 14, controls the behavior of a pivot drive cylinder 20, causing it to act on a pivot 22 coupling the lower frame 12 to the upper frame 14. The pivot 22 is preferably a structure having a pivoting action. The control system 18 adjusts the pivot drive cylinder 20, changing the upper frames 14 position relative to the lower frame 12 through pivoting motion in the pivot 22. In one embodiment, the control system 18 is mounted on the upper frame 14. As discussed below, a variety of mechanisms for pivoting rotation are contemplated according to various embodiments.

Still referring to FIG. 1, the pivot 22 may include a platform 23 to which the upper frame 14 is coupled, the pivot coupled to the lower frame 12. Additionally, the motorcycle may be recumbent, allowing a user (not shown) to sit in a more conventional position.

Still referring to FIG. 1, since the motorcycle 10 is able to remain upright at a standstill, features common to three and four-wheeled vehicles may be incorporated according to preference. In particular, the motorcycle 10 may include a housing 24, which may function as a protective cage in the event of an accident, and may also be sufficiently enclosed to prevent moisture and wind intrusion. Since users no longer need to control lean, the housing 24 may incorporate a more conventional seat 28, a steering wheel 30 in lieu of handles and a dashboard 32. In such an embodiment, a conventional gas pedal 34 and brake pedal 36 may be installed in the housing 24.

Figures 2A, 2B:
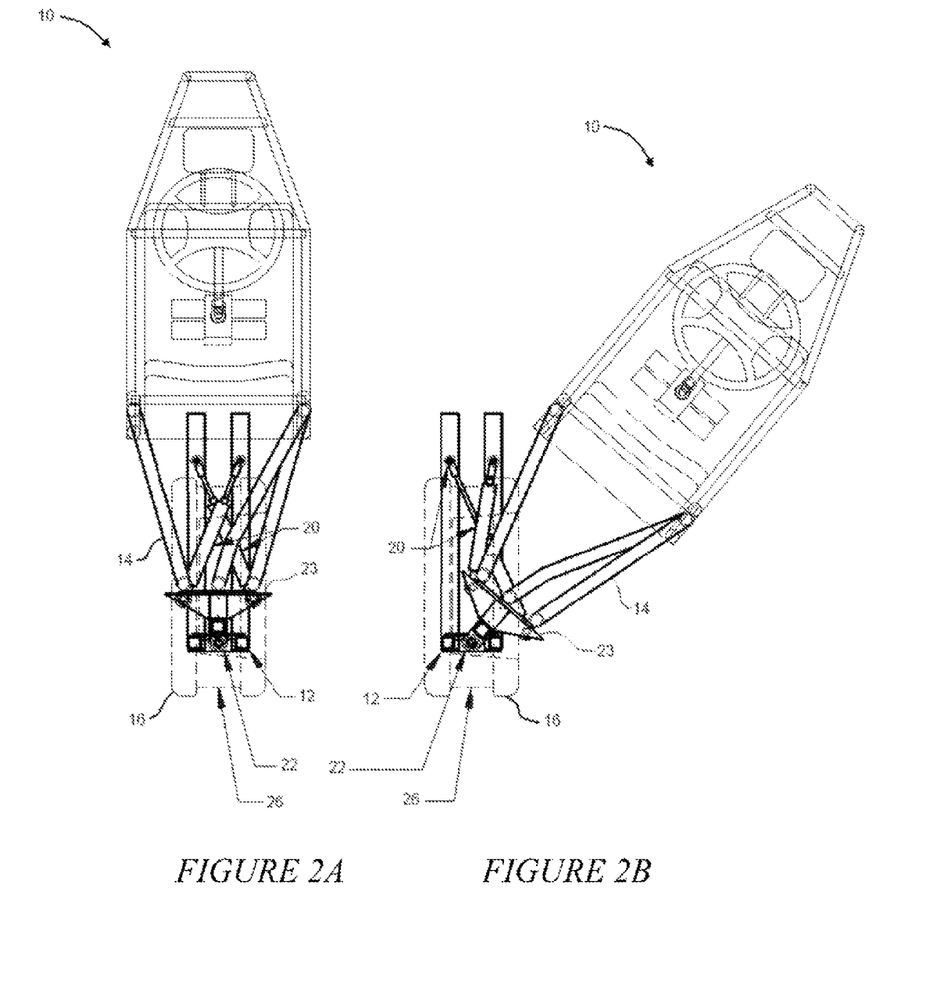
FIGS. 2A and 2B are rear views, respectively, of the motorcycle in an upright position and in a leaning position.

Referring to FIGS. 2A and 2B, the channel wheels 16 each have a channel 26 incorporated in them to provide a reduced profile, and may be constructed from a single tire having a channel 26, or two tires with a channel between them according to design and manufacturing preference. The purpose of the channel 26 is to allow the channel wheels 16 to ride over traffic markers such as reflectors, ceramic dome-shaped indicators, and in particular to travel over such obstacles when the motorcycle 10 is in motion on a street or highway. The wide flat profile of the channel wheels 16 also allows the motorcycle 10 to balance when at a stop due to their substantially wide profile.

Referring to FIG. 2A, the motorcycle 100 includes two pivot drive cylinders 20 arranged in a cross pattern. The top of each pivot drive cylinder 20 is coupled to the upper frame 14. while the bottom of each pivot drive cylinder 20 is connected to the lower frame. In this embodiment the upper frame 14 and lower frame 12 are connected along a single pivot 22. Referring to FIG. 2B, when the motorcycle leans over, the cross pattern of the pivot drive cylinders 20 allows for a greater extension of each pivot drive cylinder, and therefore a greater total length of travel correction.

Figure 3:
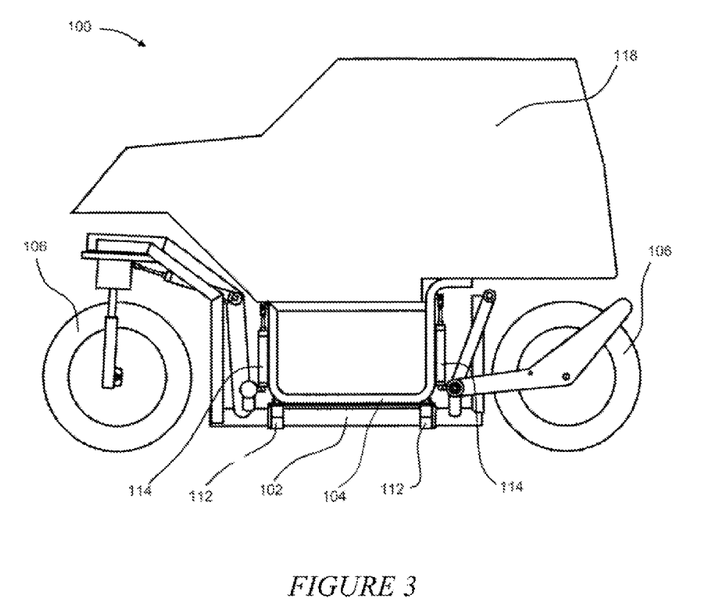
FIG. 3 is a side view of a first alternative embodiment motorcycle.

Referring to FIG. 3, a side view of a first alternative motorcycle 100 is shown. The motorcycle 100 (and remaining embodiments thereof) includes a lower frame 102, an upper frame 104 for a rider, and channel wheels 106. Using the same principal of operation, the lower frame 102 allows the upper frame 104 to lean relative to the channel wheels 106, allowing the lower frame 102 to counterbalance the upper frame 104 against the channel wheels 106 if the upper frame 104 begins to lean in a direction other than vertical. The channel wheels 106 are preferably extra wide, forming an outrigger-type structure supporting effective counterbalancing.

Figure 4:
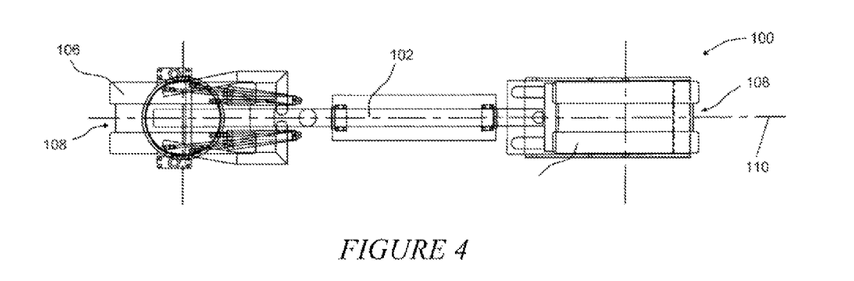
FIG. 4 is a top view of the first alternative embodiment motorcycle without the housing.
Figures 5A, 5B:
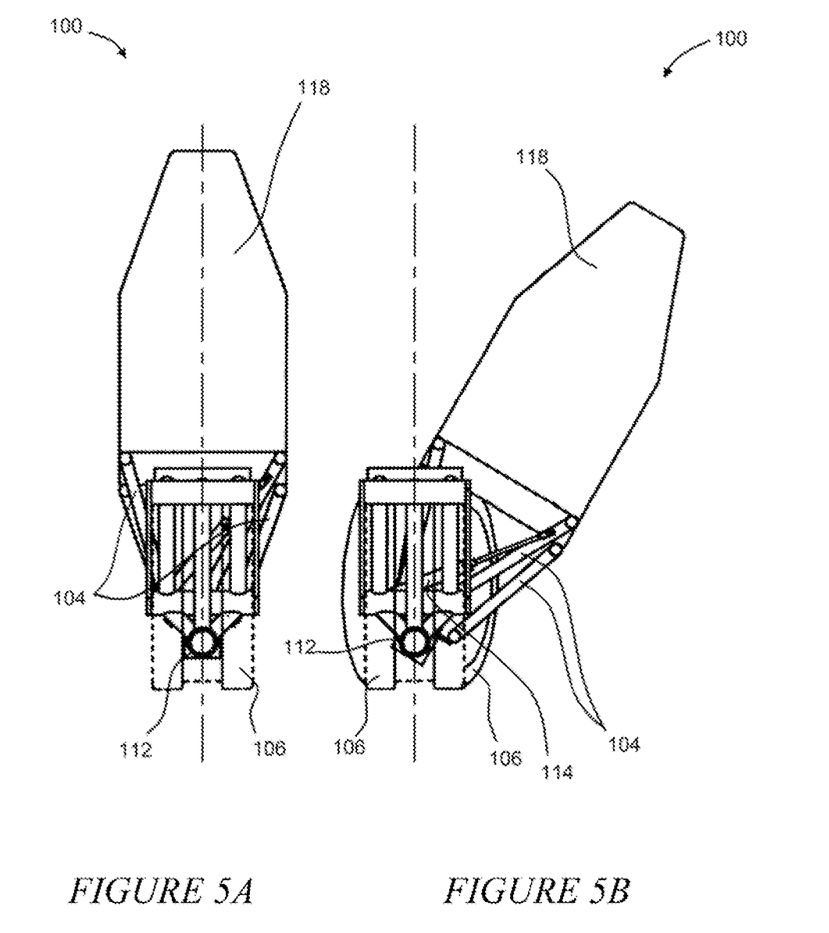
FIGS. 5A and 5B are rear views, respectively of the first alternative embodiment motorcycle in an upright position and in a leaning position.

Referring to FIG. 4, the motorcycle 100 is shown without the housing and with a center line 110 indicating the general line of travel of the motorcycle 100 and the axis about which the upper frame 104 (FIG. 3) and lower frame 102 pivot. Because the centerline 110 is centered in the channel 108 of the channel wheels 106, the channel wheels 106 provide effective resistance as the upper frame 104 turns on the pivot Referring to figure SA the motorcycle 100 is shown in an upright position. In this position the lower frame 102 and upper frame 104 are in alignment as is customary for any conventional two wheeled vehicle. Referring to FIG. 5I, the upper frame 104 is able to lean relative to the lower frame 102. This may be needed to maintain balance when one of the channel wheels 106 is turned, when cornering, as shown in FIG. 3B, or may be performed when the motorcycle 100 is directed in a straight line at a standstill to compensate for the upper frame 104 leaning relative to the lower frame 102. Preferably, the upper frame 104 is connected to a pivot drive cylinder 114, which functions to position the upper frame 104 relative to the lower frame 102, in some embodiments the driver may be in manual control the pivoting function.

Figure 6:
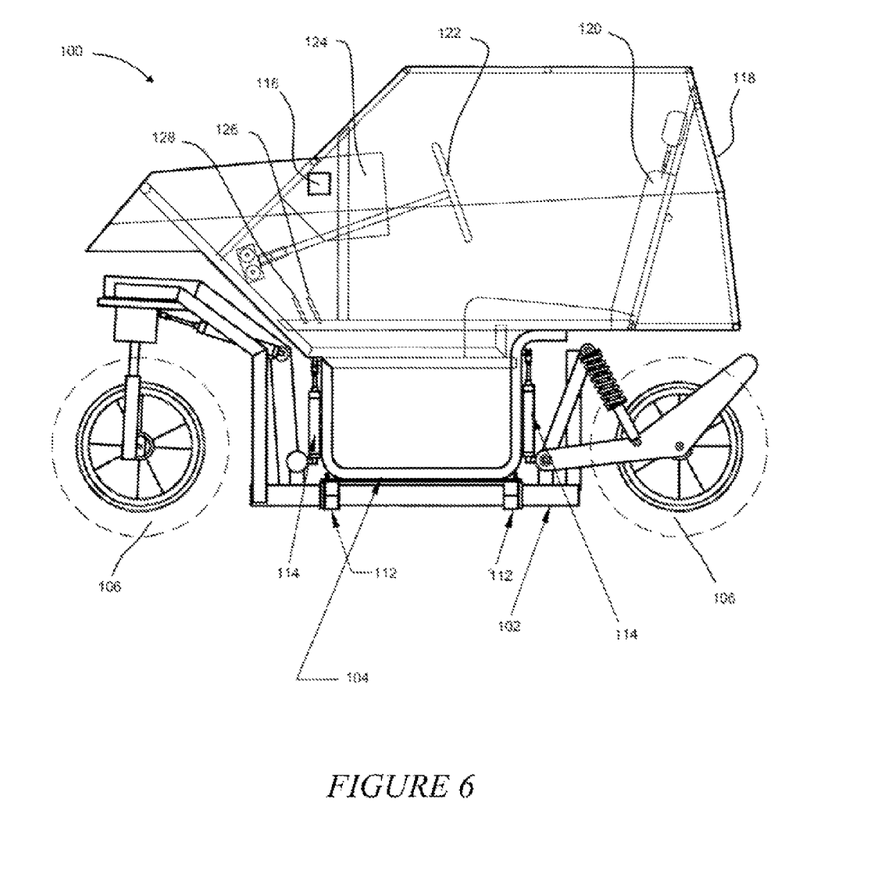
FIG. 6 is a side view of the first alternative embodiment motorcycle showing operational parts.

FIG. 6 provides a more detailed view of the motorcycle 100 with the interior of the housing 118 exposed. In order to stabilize the motorcycle 100, two pivot drive cylinders 114 are incorporated near the channel wheels 106. In order to allow the lower frame 102 and upper frame 104 to move relative to one another, the pivots 112 connect the upper frame 104 to the lower frame 102. In order to allow the motorcycle 100 to automatically correct for lean in the upper frame 104, a control system 116 for maintaining level may be incorporated into the upper frame 104. The control system 116 may not automatically engage the pivot drive cylinders 114, but may merely alert a driver (not shown) that the upper frame 104 is beginning to lean away from vertical, and allow the driver to manually control and correct the lean as desired.

Still referring to FIG. 6, like the primary embodiment motorcycle 10 (FIG. 1), since the first alternative embodiment motorcycle 100 is able to remain upright at a standstill, features common to three and four-wheeled vehicles may be incorporated according to preference. In particular, the motorcycle 100 includes a housing 118, which may function as a protective cage in the event of an accident, and may also be sufficiently enclosed to prevent moisture and wind intrusion. Since users no longer need to control lean, the housing 118 may incorporate a more conventional seat 120, a steering wheel 122 in lieu of handles and a dashboard 124, in which the control system 116 and an associated display (not shown) may be housed. In such an embodiment, a conventional gas pedal 126 and brake pedal 128 may be installed in the housing 118. The housing 118 and its related features may be incorporated into any of the embodiments discussed herein.

Figure 7:
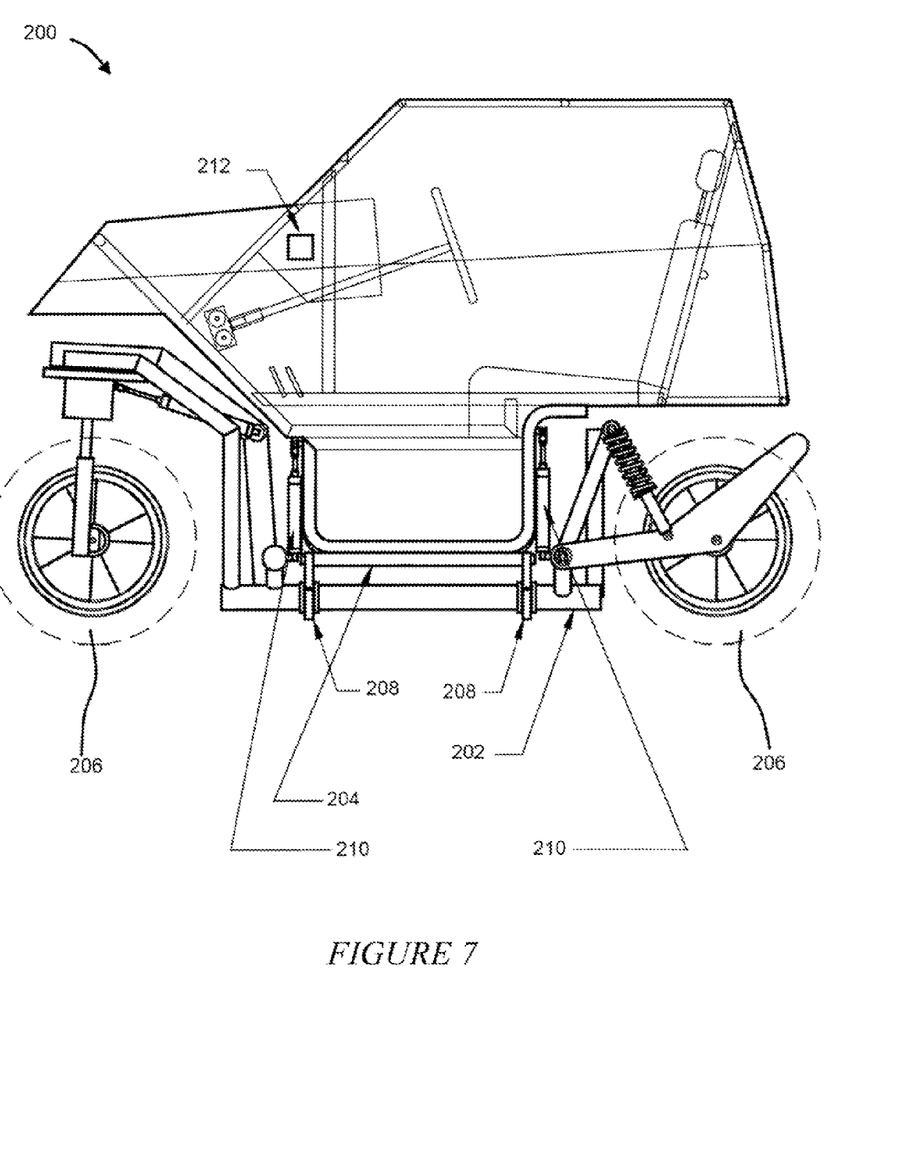
FIG. 7 is a side view of a second alternative embodiment lean-compensating motorcycle with channel wheels.

Referring to FIG. 7, a second alternative embodiment motorcycle 200 is shown. In the second alternative embodiment, rotating pivots 208 potentially including pivot arms (not shown) are used to connect the lower frame 202 to the upper frame 204. In this embodiment, the channel wheels 206 are connected to the lower frame 202 and the pivots 208 are used to articulate the upper frame 204 relative to the lower frame 202 when the pivot drive cylinder 210 is active. A control system 212 is used to maintain level as with the primary embodiment either automatically or manually.

Figures 8A, 8B:
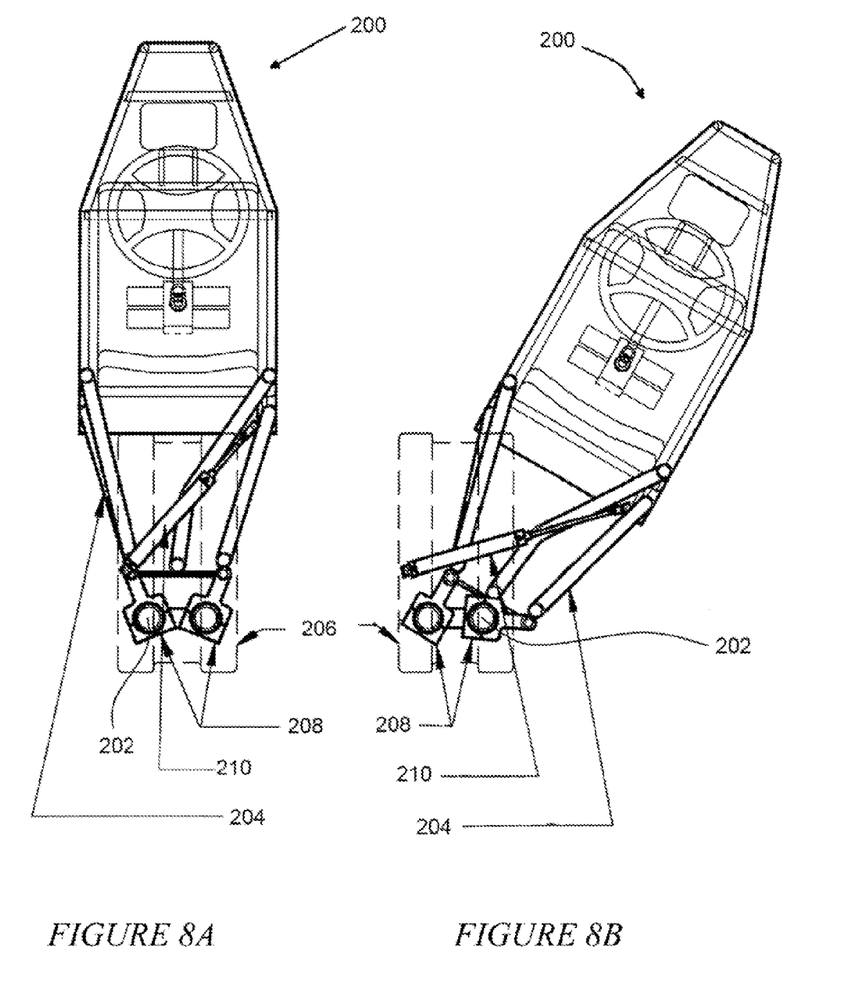
FIGS. 8A and 8B are rear views, respectively of the second alternative embodiment motorcycle in an upright position and in a leaning position.

Referring to FIGS. 8A and 8B, a rear view of the motorcycle 200 shows the changing orientation of the pivots 208, as they compensate for the motorcycle 200 in an upright position and when the upper frame 204 is leaning relative to the lower frame 202. The pivot drive cylinders 210 are used to adjust the lean angle of the upper frame 204.

Figure 9:
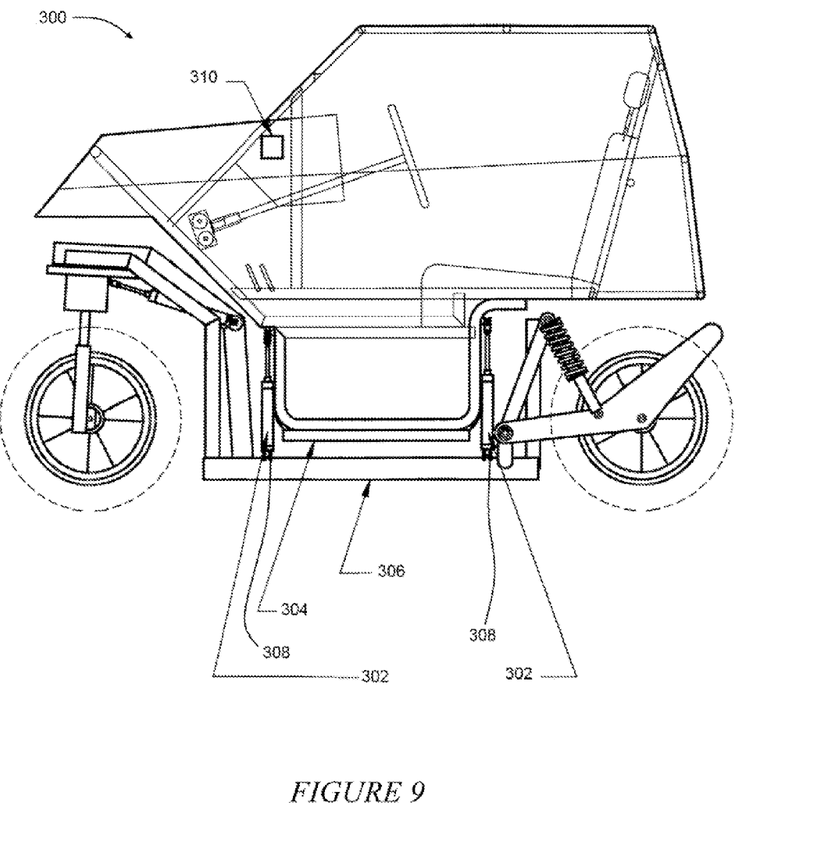
FIG. 9 is a side view of a third alternative embodiment lean-compensating motorcycle with channel wheels.

Referring to FIG. 9 a third alternative embodiment motorcycle 300 is shown. In the third alternative embodiment, four pivot drive cylinders 302 are used to articulate the upper frame 304 relative to the lower frame 306. In this embodiment, pivots 308, which may be characterized as pivot points between the upper frame 304 and lower frame 306 allow them to move relative to each other. As with the other embodiments, a control system 310 for maintaining level may be incorporated on the upper frame 304, allowing for automatic or manual lean control.

Figures 10A, 10B:
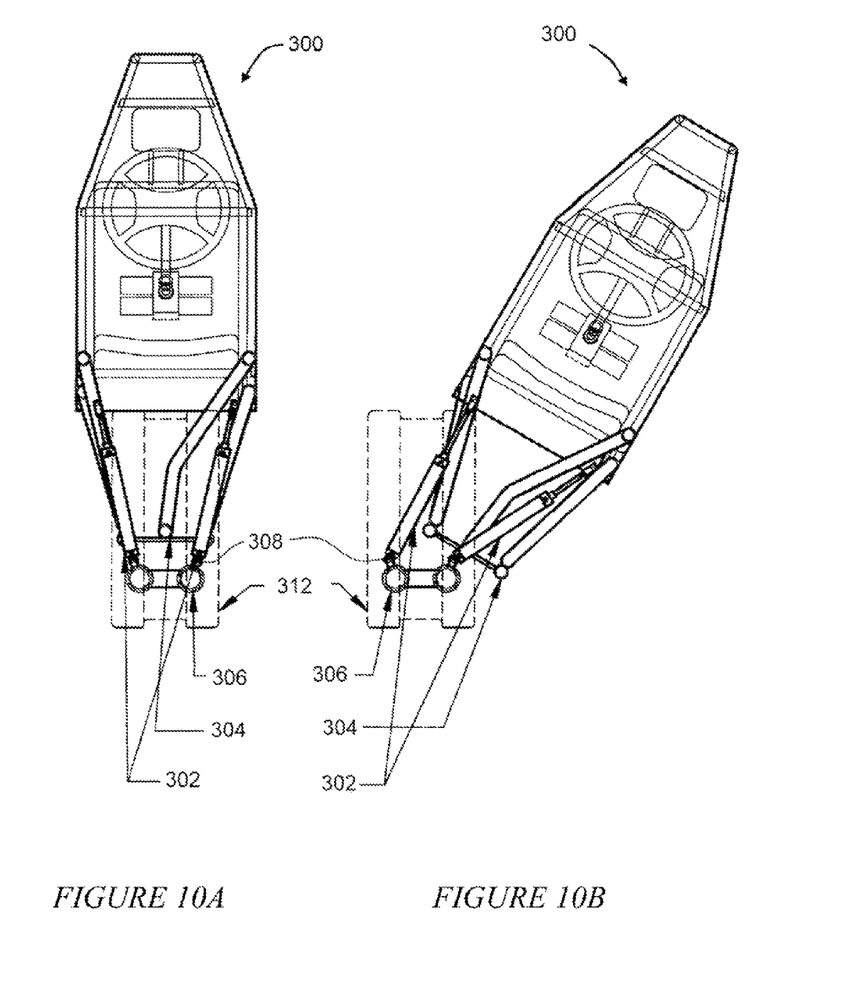
FIGS. 10A and 10B are rear views, respectively of the third alternative embodiment motorcycle in an upright position and in a leaning position.

Referring to FIGS. 10A and 10B, a rear view of the motorcycle 300 shows the support cylinders 302 in operation and the position of the upper frame 304 and the lower frame 306. Also shown in this view is the position of the channel wheels 312 relative to the upper frame 304 as it leans at an angle.

Figure 11:
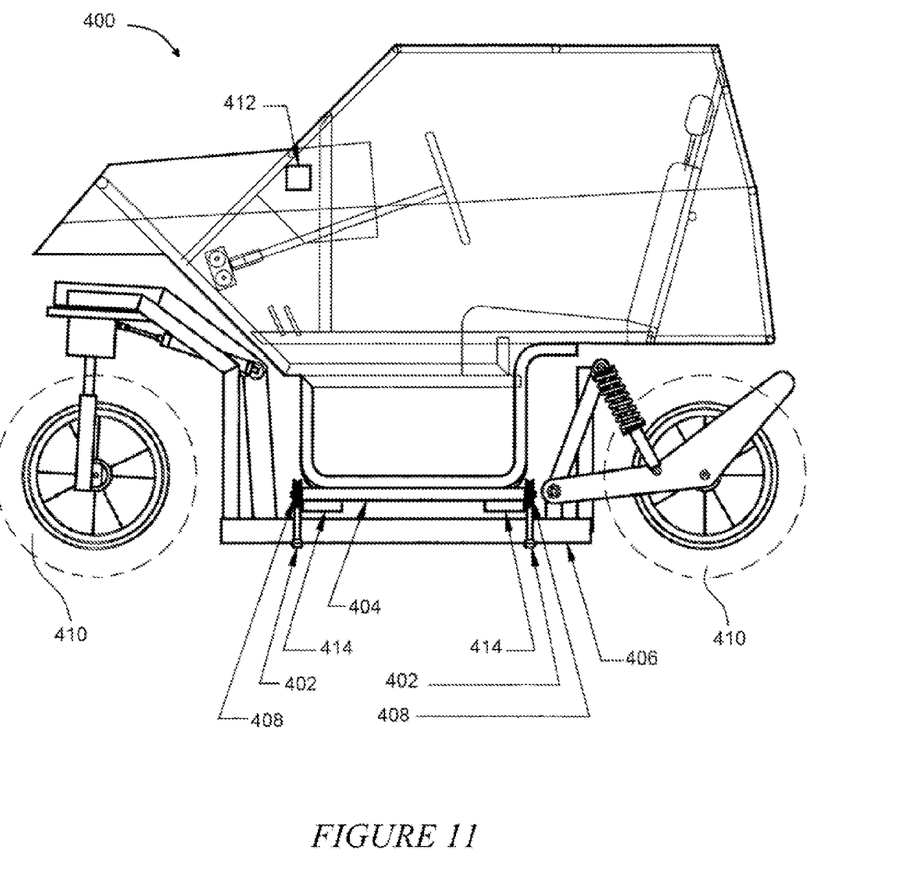
FIG. 11 is a side view of a fourth alternative embodiment lean-compensating motorcycle with channel wheels.

Referring to FIG. 11, a fourth alternative embodiment motorcycle 400 is shown. In the fourth alternative embodiment, two curved rails 402 are used for articulating the upper frame 404 relative to the lower frame 406. In one embodiment grooved wheels 408, not to be confused with the channel wheels 410, are positioned on the curved rail 402 for swinging the upper frame 404 from an upright to a leaning position. As with the other embodiments, a control system 412 for maintaining level may be incorporated on the upper frame 404 allowing for automatic or manual lean control. In this embodiment, the addition of drive motor 414 may be necessary to rotate the upper frame 404 relative to the lower frame 406.

Figures 12A, 12B:
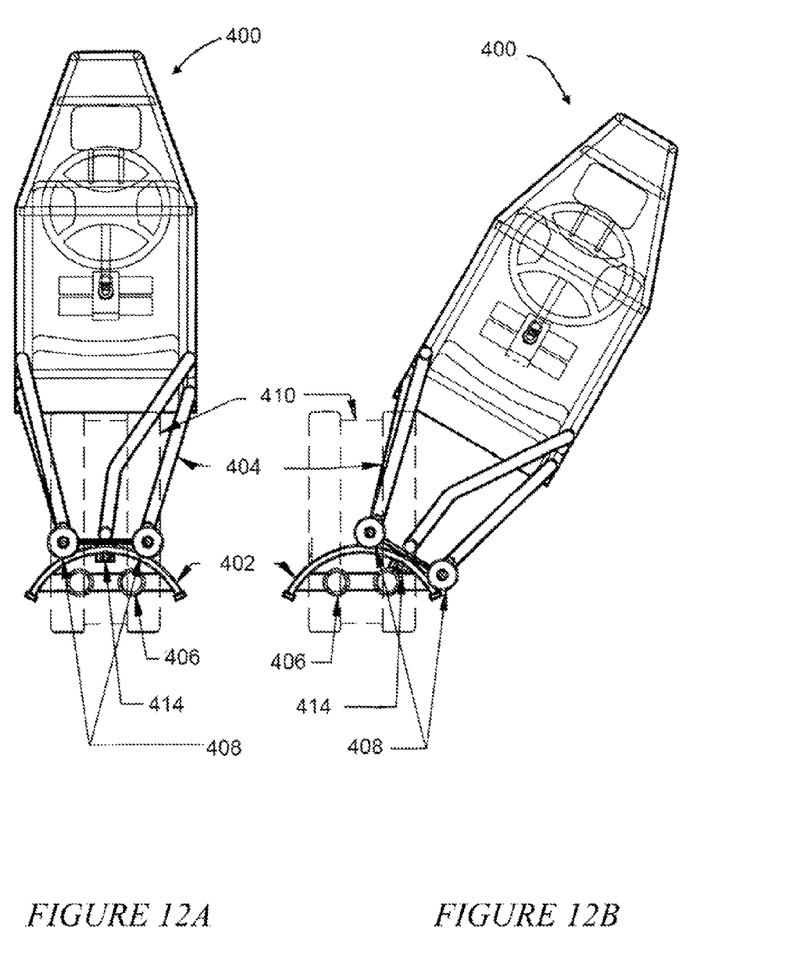
FIGS. 12A and 12B are rear views, respectively of the fourth alternative embodiment motorcycle in an upright position and in a leaning position.

Referring to FIGS. 12A and 12B, a rear view of the motorcycle 400 shows the curved rail 402, which is a substantially arced member over which grooved wheels 408 travel. The grooved wheels 408 are attached to the upper frame 404, and may incorporate the drive motor 414 for articulating the upper frame 404 relative to the lower frame 406.

The foregoing description of the preferred embodiment 10 of the invention is sufficient in detail to enable one skilled in the art to make and use the invention. It is understood, however, that the detail of the preferred embodiment presented is not intended to limit the scope of the invention, in as much as equivalents thereof and other modifications which come within the scope of the invention as defined by the claims will become apparent to those skilled in the art upon reading this specification.

What is claimed is:

1. A single track two-wheeled motorcycle configured for balancing a user, the motorcycle comprising:
    a lower frame having the two wheels;
    an upper frame having a user support;
    a pivot structure coupled to the lower frame and coupled to the upper frame, the pivot structure set on an axis substantially parallel to the motorcycle's axis of travel for allowing pivoting movement of the lower frame relative to the upper frame;
    a pivot drive coupled to the lower frame and coupled to the upper frame, the pivot drive controlling pivoting movement of the lower frame relative to the upper frame about the pivot structure; and
    a control system causing the pivot drive to maintain the upper frame in a substantially vertical position.

2. The motorcycle of claim 1 wherein at least one of the wheels is wider than the lower frame.

3. The motorcycle of claim 1 wherein at least one of the wheels has a central channel.

4. The motorcycle of claim 3 wherein the central channel is sized to accommodate raised pavement markers.

5. The motorcycle of claim 3 wherein the central channel has a hub.

6. The motorcycle of claim 1 wherein the upper frame comprises a housing for enclosing the user.

7. The motorcycle of claim 1 wherein the upper frame comprises a protective cage surrounding the user.

8. The motorcycle of claim 1 wherein the upper frame comprises a recumbent, automobile-type seat.

9. The motorcycle of claim 1 wherein the upper frame includes a steering wheel, a brake pedal and a gas pedal.

10. The motorcycle of claim 1 further comprising a second pivot drive arranged in a cross configuration to the pivot drive.

11. The motorcycle of claim 1 wherein the control system includes an off-level alarm.

12. The motorcycle of claim 1 wherein the control system permits manually controlled pivoting.

13. The motorcycle of claim 1 further comprising a curved rail in static relation to the lower frame, and about winch the upper frame travels in an arc.

14. The motorcycle of claim 13 wherein grooved wheels are positioned on the curved rail and coupled to the upper frame.

15. The motorcycle of claim 14, further comprising a drive motor that controls movement of the grooved wheels.

16. A lean compensating single tracked two-wheeled motorcycle for balancing a user, comprising:
    a pivoting frame having a lower section and an upper section in a pivoting relationship about an axis substantially parallel to the motorcycle's axis of travel;
    the lower section coupled to the two wheels of the motorcycle;
    the upper section having a housing for protecting the user;
    the lower section and the upper section connected by a pivot driver;
    wherein at least one of the two wheels is substantially wider than the lower section, so that when the upper section pivots relative to the lower section, the lower section counterbalances itself against at least one of the two wheels; and
    a level-sensing control system causing the pivot driver to maintain the upper frame upright whenever the upper frames lists away from vertical.

17. The motorcycle of claim 16, wherein at least one of the two wheels comprises a channel wide enough to accommodate a raised highway marker.

* * * * *